United States Patent
Senoo

(10) Patent No.: US 8,853,912 B2
(45) Date of Patent: Oct. 7, 2014

(54) COIL FIXING DEVICE FOR FIXING COIL TO ELECTRIC MOTOR, AND ELECTRIC MOTOR HAVING THE COIL FIXING DEVICE

(71) Applicant: FANUC Corporation, Yamanashi (JP)

(72) Inventor: Tatsuya Senoo, Yamanashi (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 0 days.

(21) Appl. No.: 13/865,246

(22) Filed: Apr. 18, 2013

(65) Prior Publication Data

US 2013/0320800 A1    Dec. 5, 2013

(30) Foreign Application Priority Data

Jun. 1, 2012  (JP) .................................. 2012-126181

(51) Int. Cl.
*H02K 3/46*   (2006.01)
*H02K 3/52*   (2006.01)

(52) U.S. Cl.
CPC .................................... *H02K 3/522* (2013.01)
USPC ............................. 310/214; 310/215; 310/269

(58) Field of Classification Search
CPC ................................ H02K 3/522; H02K 3/52
USPC ............................. 310/214–215, 71, 194, 269
See application file for complete search history.

(56) References Cited

U.S. PATENT DOCUMENTS

| | | | | |
|---|---|---|---|---|
| 5,194,775 | A * | 3/1993 | Cooper | 310/260 |
| 8,358,045 | B2 * | 1/2013 | van Heyden et al. | 310/194 |
| 2002/0145354 | A1 * | 10/2002 | Hakamata | 310/179 |
| 2004/0084988 | A1 * | 5/2004 | Sheeran et al. | 310/218 |
| 2007/0046129 | A1 | 3/2007 | Suginobu | |
| 2009/0261682 | A1 * | 10/2009 | Fubuki et al. | 310/201 |

FOREIGN PATENT DOCUMENTS

| | | |
|---|---|---|
| JP | 2001-211592 A | 8/2001 |
| JP | 2009-106004 | 5/2009 |
| JP | 2009-291004 | 12/2009 |
| JP | 2010-246269 | 10/2010 |

* cited by examiner

*Primary Examiner* — Thanh Lam
(74) *Attorney, Agent, or Firm* — Drinker Biddle & Reath LLP

(57) ABSTRACT

A coil fixing device capable of accurately positioning and fixing a coil to a slot of a stator core of an electric motor, and an electric motor having the fixing device, while not using adhesive and having a structure not affecting the characteristic of the electric motor. A positioning member of the fixing device has a coupling member positioned at an axial end of the stator core; a plurality of protruding portions connected to the coupling member at the same angular intervals as the coils, each protruding portion radially inwardly extending from the coupling member; and a latching portion connected to a front end of each protruding portion, the latching portion extending from the front end of each protruding portion in a direction across an extending direction of the protruding portion.

5 Claims, 6 Drawing Sheets

COIL FIXING DEVICE FOR FIXING COIL TO ELECTRIC MOTOR, AND ELECTRIC MOTOR HAVING THE COIL FIXING DEVICE

RELATED APPLICATION DATA

This application claims priority under 35 U.S.C. §119 and/or §365 to Japanese Application No. 2012-126181 filed Jun. 1, 2012, and Japanese Application No. 2012-276964 filed Dec. 19, 2012, the entire contents of which are incorporated herein by reference.

BACKGROUND OF THE INVENTION

1. Field of the Invention

The present invention relates to a coil fixing device for positioning and fixing a coil to a stator core of an electric motor, and an electric motor having the coil fixing device.

2. Description of the Related Art

There are various methods for manufacturing an electric motor having a rotor and a stator. In one example, as shown in FIG. 11, a winding wire 102 is wound in a direction indicated by an arrow so as to constitute a coil 104 having a predetermined shape (which may be referred to as a unit coil), and a plurality of coils 104 are prepared. Then, as shown in FIG. 12, unit coils 104 are inserted into slots 110 of on a stator core 108 formed on an inner surface of a stator 12, and connected to each other.

In this regard, as shown in FIG. 13, when coil 104 inserted into slot 110 is not fixed by a means, coil 104 may be detached from slot 110 in an arrow direction. In order to avoid the detachment, an adhesive agent may be used. Further, as another means, Japanese Unexamined Patent Publication (Kokai) No. 2001-211592 discloses a fixing method using a wedge. Concretely, this document describes that "when wedge 5 is inserted into slot 2, as shown in FIG. 1(a), wedge 5 is inserted from above coil 3 while cut surface 51 formed by a weak line is outwardly directed. Then, by hitting a bent portion, wedge 5 becomes planar within the slot as shown in FIG. 1(b)."

When the adhesive agent is used to fix the coil, an operation thereof may be cumbersome, and components of the electric motor such as the coil may be chemically reacted with the adhesive agent. On the other hand, as another means for avoiding the detachment of the coil from the slot of the rotor core, molding inside the stator by using resin may be possible. However, even in this case, it is necessary to temporarily fix the coil by the adhesive agent, etc., until the resin is cured.

In the fixing method of Japanese Unexamined Patent Publication (Kokai) No. 2001-211592, although the adhesive agent is not used, it is necessary to form a notch in a core (or an iron core of the rotor) for holding planar wedge 5. When such a notch is formed in the core, a magnetic flux may be disturbed or distorted and the characteristic of the electric motor may be affected in an adverse way.

SUMMARY OF THE INVENTION

In view of the above problems, the object of the present invention is to provide a coil fixing device for accurately positioning and fixing a coil to a slot of a stator core of an electric motor, and an electric motor having the coil fixing device, while having a structure not affecting the characteristic of the electric motor.

The present invention provides a coil fixing device for an electric motor including a stator having a stator core with a plurality of slots, a rotor rotatable relative to the stator, and a plurality of coils respectively inserted into the plurality of slots, the coil fixing device being used to position and fix each of the plurality of coils to the stator core, the coil fixing device having a coil positioning member comprising: a coupling member positioned at an axial end of the stator core; a plurality of protruding portions connected to the coupling member at the same angular intervals as the plurality of coils, each protruding portion radially inwardly extending from the coupling member; and a latching portion connected to a front end of each protruding portion, the latching portion extending from the front end of each protruding portion in a direction across an extending direction of the protruding portion.

In a preferred embodiment, at least two kinds of coil positioning members are located at both axial ends of the stator core, the coil positioning members having latching portions which have different lengths and extend in directions away from the stator core.

In a preferred embodiment, two latching portions are arranged at the front end of each protruding portion of the coil positioning member, the two latching portions extending in opposed directions in relation to an axial direction of the stator.

In a preferred embodiment, a latching portion is arranged at the front end of each protruding portion of the coil positioning member, the latching portion extending in a circumferential direction of the stator.

In a preferred embodiment, coil positioning members having the same shape are located at both axial ends of the stator core.

In a preferred embodiment, the coupling member has an annular shape with an outer circumferential edge which is fitted with an inner surface of the stator.

The present invention further provides an electric motor having the above coil fixing device.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTION

Figure 1:
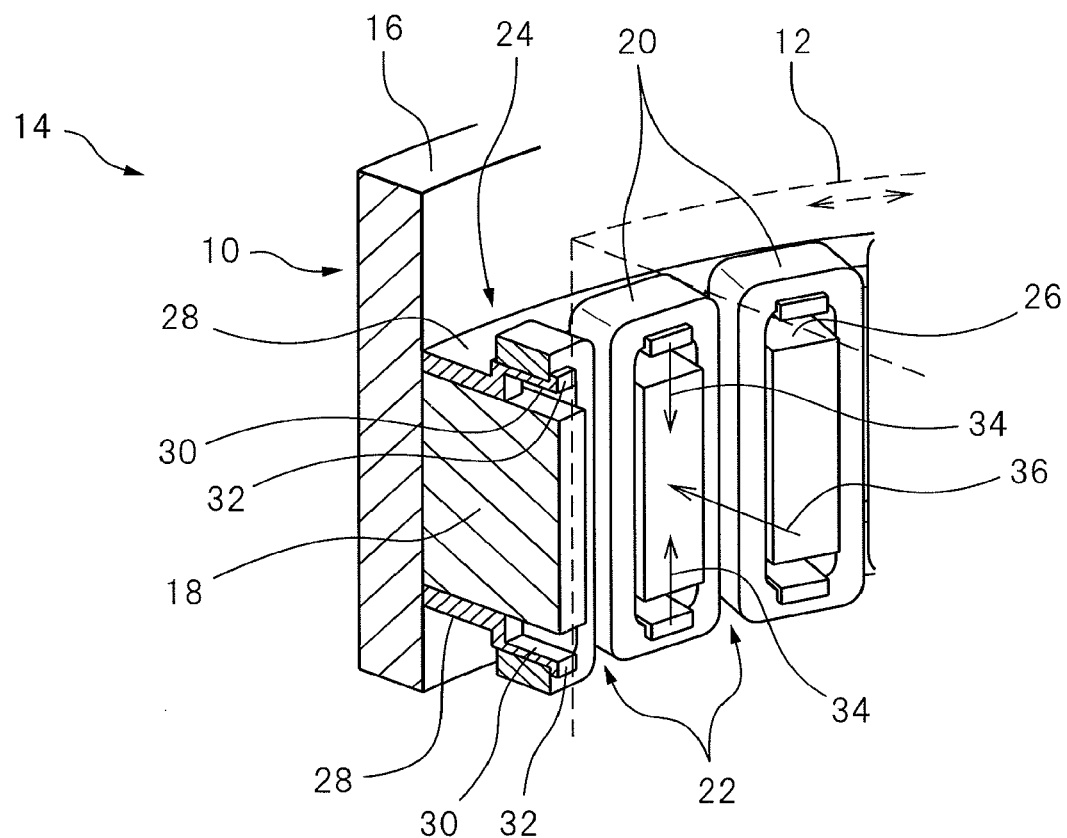
FIG. 1 is an enlarged view of a part of a stator where a coil fixing device according to a first embodiment of the present invention is arranged.

FIG. 1 is a view of an example wherein a coil fixing device according to a first embodiment of the invention is applied to an electric motor. The coil fixing device is used in an electric motor 14 having a stator 10, a rotor 12 (schematically shown) positioned inside stator 10 and rotatable relative to stator 10, in order to position and fix a coil to the motor. Stator 10 has a generally cylindrical case 16 and a stator core 18 formed on an inner surface of case 16, wherein a plurality of slots 22 for receiving respective coils 20, similar coils 104 as described above, are formed on stator core 18. Since components other than the coil fixing device may be conventional, a detailed explanation thereof is omitted.

Figure 2:
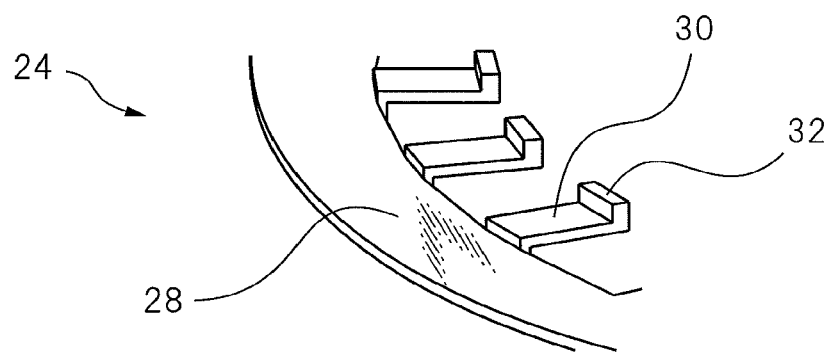
FIG. 2 is an enlarged view of a part of a positioning member constituting the coil fixing device of FIG. 1.

FIG. 2 is an enlarged view showing a detail of the coil fixing device. The coil fixing device has two positioning members 24, and each positioning member 24 has a coupling member 28 positioned at an axial end 28 of stator core 18; a plurality of protruding portions 30 connected to coupling member 28 at the same angular intervals as coils 20 to be fixed to stator core 18, each protruding portion 30 radially inwardly extending from coupling member 28; a latching portion 32 connected to a front end of each protruding portion 30, latching portion 32 extending from the front end of each protruding portion 30 in a direction (in the illustrated embodiment, a direction away from stator core 18 or an axial direction of stator core 18) across an extending direction of protruding portion 30. In the illustrated embodiment, coupling member 28 is a generally annular member which couples protruding portions 30, protruding portion 30 radially inwardly extends while being separated from axial end 26 of stator core 18, and, protruding portion 30 and corresponding latching portion 32 are at right angles to each other. In addition, positioning member 24 may be integrally manufactured by resin molding, etc., and protruding portion 30 is elastically deformable relative to coupling member 28.

In the embodiment of FIG. 1, two positioning members 24 are attached to respective axial ends of stator core 18 while being oppositely oriented to each other, so as to constitute the coil fixing device. When such a coil fixing device is used, coil 20 is inserted into slot 22 in an inserting direction 36 (generally in the radial direction), while elastically deforming latching portion 32 in a direction 34 (generally in the axial direction) so that latching portion 32 approaches axial end 26 of the stator core. Then, by returning latching portion 32 to the original position so that latching portion 32 is engaged with an inner circumferential portion of coil 20, each coil 20 is accurately positioned and fixed by means of latching portion 32 and protruding portion 30.

Although two positioning members 24 are used in the first embodiment, only one positioning member may be used, when it is not desired that coil 20, which is once held and fixed to stator core 18, is assuredly prevented being displaced in the inserting direction thereof (generally the radially outward direction from the rotation axis of the rotor in the illustrated embodiment). Also in this case, a certain effect may be obtained regarding the positioning of coil 20.

Figure 3:
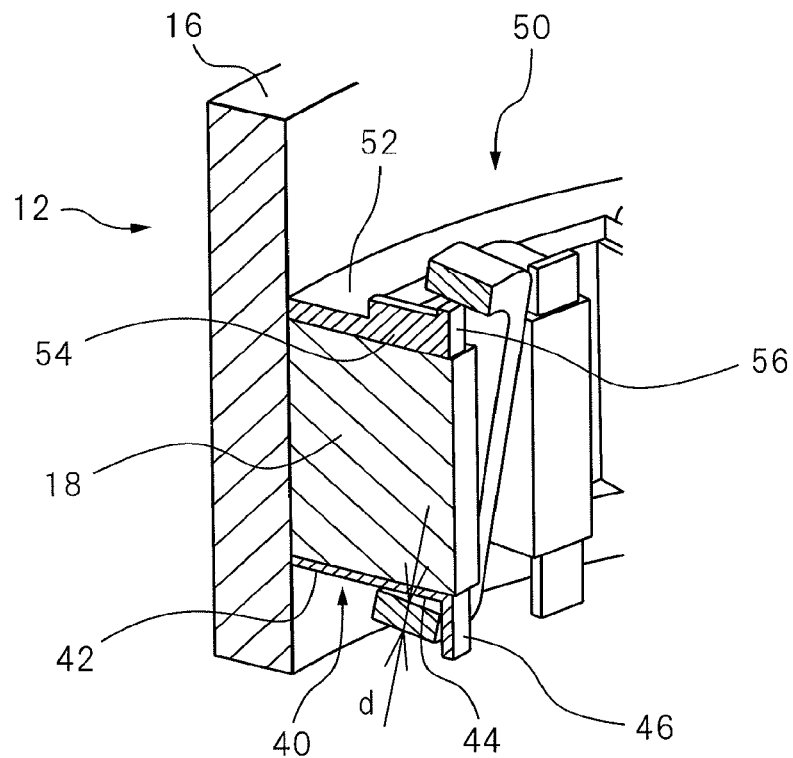
FIG. 3 is an enlarged view of a part of a stator where a coil fixing device according to a second embodiment of the present invention is arranged.

FIG. 3 is a view of an example where a coil fixing device according to a second embodiment of the present invention is applied to the electric motor. In the first embodiment, the same (but oppositely oriented) positioning members are attached to the axial both ends of stator core 18. On the other hand, in the second embodiment, positioning members having different structures are attached to the axial ends of stator core, concretely, the lengths of latch portions thereof are different. In detail, a lower positioning member 40 has a coupling member 42 positioned on the axial end of stator core 18; a plurality of protruding portions 44 connected to coupling member 42 at the same angular intervals as coils 20 to be fixed to stator core 18, each protruding portion 44 radially inwardly extending from coupling member 42; a latching portion 46 connected to a front end of each protruding portion 44, latching portion 46 extending from the front end of each protruding portion 44 in a direction (in the illustrated embodiment, a direction away from stator core 18 or an axial direction of stator core 18) across an extending direction of protruding portion 44. In the illustrated embodiment, coupling member 42 is a generally annular member which couples protruding portions 44. Unlike the first embodiment, protruding portion 44 extends while contacting the axial end of stator core 18. In addition, the length of latching portion 46 may be relatively long (for example, equal to or more than thickness "d" of coil 20).

On the other hand, an upper positioning member 50 has a coupling member 52 positioned on the axial end of stator core 18; a plurality of protruding portions 54 connected to coupling member 52 at the same angular intervals as coils 20 to be fixed to stator core 18, each protruding portion 54 radially inwardly extending from coupling member 42; a latching portion 56 connected to a front end of each protruding portion 54, latching portion 56 extending from the front end of each protruding portion 54 in a direction away from stator core (in the illustrated embodiment, an axial direction of stator core 18). In the illustrated embodiment, coupling member 52 is a generally annular member which couples protruding portions 54. Unlike the first embodiment, protruding portion 54 also extends while contacting the axial end of stator core 18. In addition, the length of latching portion 56 may be shorter than the length of latching portion 46 (for example, equal to or less than a half or one-third of thickness "d" of coil 20).

Figure 4:
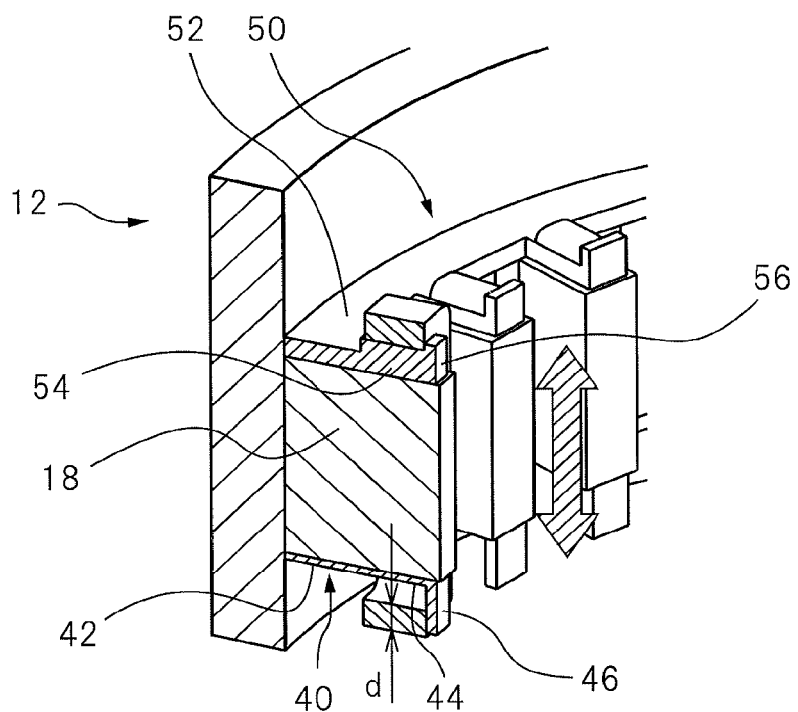
FIG. 4 is a view, similar to FIG. 3, showing a state wherein an attachment operation of a coil is completed.

In the second embodiment, coil 20 is attached to the stator as described below. First, as shown in FIG. 3, coil 20 is inclined relative to the axial direction (or the vertical direction) of stator 10, so that a lower end of coil 20 is engaged with longer latching portion 46 of lower positioning member 40. Next, as shown in FIG. 4, by rotating an upper end of coil 20 about generally the lower end of the coil toward the inner surface of stator 10, the upper end of the coil is engaged with shorter latching portion 56 of upper positioning member 50. By virtue of this, coil 20 is accurately positioned and fixed to the stator by means of positioning members 40 and 50.

In the second embodiment, by adjusting the length of latching portion 56, coil 20 may be positioned and fixed even when protruding portion 54 and/or latching portion 56 is not elastically deformed. Therefore, it is not necessary to manufacture positioning members 40 and 50 from a flexible material, and the positioning members may be manufactured from a substantially rigid material. As illustrated, protruding portions 44 and 54 may contact respective axial ends of stator core. Therefore, by adjusting the axial length (or the thickness) of each protruding portion, the axial position of each coil 20 relative to stator 10 may be accurately determined.

Figure 5:
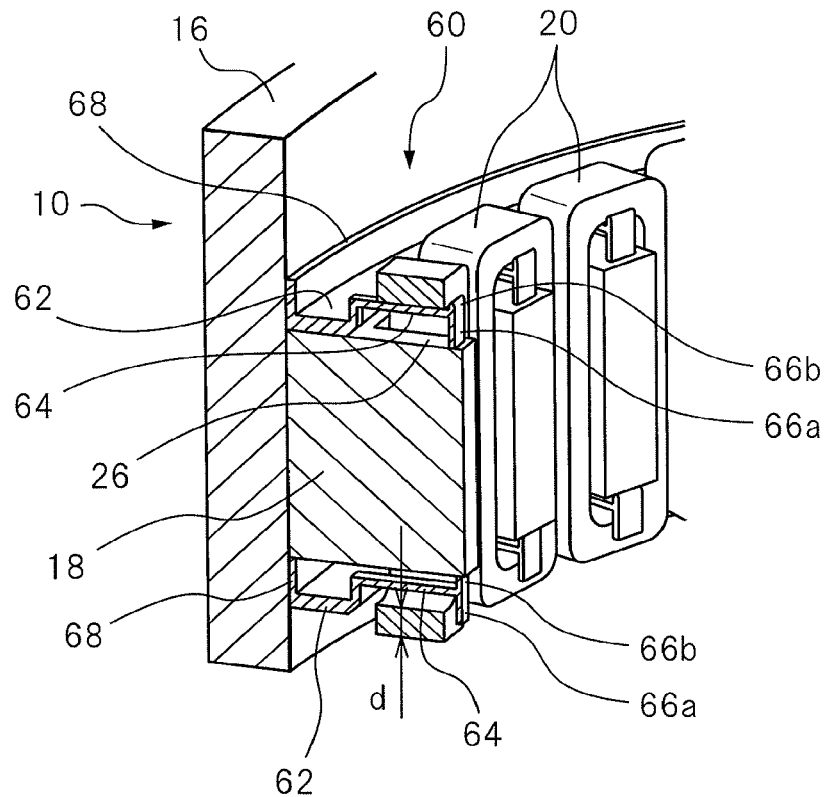
FIG. 5 is an enlarged view of a part of a stator where a coil fixing device according to a third embodiment of the present invention is arranged.
Figure 6:
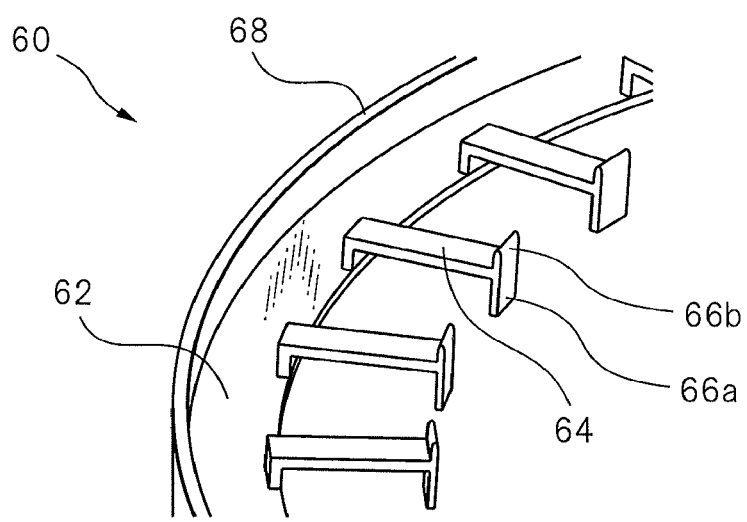
FIG. 6 is an enlarged view of a part of a positioning member constituting the coil fixing device of FIG. 5.

FIG. 5 is a view of an example where a coil fixing device according to a third embodiment of the present invention is applied to the electric motor. In the third embodiment, similarly to the first embodiment, the same positioning members are used at the upper and lower ends of the stator core. However, the third embodiment is different from the first and second embodiment in that two kinds of latching portions are arranged at each protruding portion. Concretely, as shown in FIG. 6, a positioning member 60, which constitutes the coil fixing device of the third embodiment, has a coupling member 62 positioned on axial end 26 of stator core 18; a plurality of protruding portions 64 connected to coupling member 62 at the same angular intervals as coils 20 to be fixed to stator core 18, each protruding portion 64 radially inwardly extending from coupling member 62; two latching portions 66a and 66b connected to a front end of each protruding portion 64, latching portions 66a and 66b extending from the front end of each protruding portion 64 in a direction (in the illustrated embodiment, a direction away from stator core 18 or an axial direction of stator core 18) across an extending direction of protruding portion 64. In the illustrated embodiment, coupling member 62 is a generally annular member which couples protruding portions 64, and protruding portion 64 extends while being separated from axial end 26 of stator core 18. Protruding portion 64 and latching portion 66a are at right angles to each other, and protruding portion 64 and latching portion 66b are at right angles to each other. Further, latching portions 66a and 66b extend in the opposed directions to each other.

The length of latching portion 66a may be relatively long (for example, equal to or more than thickness "d" of coil 20), similarly to latching portion 46 of positioning member 40 of the second embodiment. On the other hand, the length of latching portion 66b may be shorter than the length of latching portion 66a (for example, equal to or less than a half or one-third of thickness "d" of coil 20), similarly to latching portion 56 of positioning member 50 of the second embodiment.

Accordingly, in the third embodiment, coil 20 is attached to the stator similarly to the second embodiment. First, coil 20 is inclined relative to the axial direction (or the vertical direction) of stator 10, so that a lower end of coil 20 is engaged with longer latching portion 66a of positioning member 60 positioned at the lower side of the stator. Next, by rotating an upper end of coil 20 about generally the lower end of the coil toward the inner surface of stator 10, as shown in FIG. 5, the upper end of coil 20 is engaged with shorter latching portion 66b of positioning member 60 positioned at the upper side of the stator. By virtue of this, coil 20 is accurately positioned and fixed to the stator by means of upper and lower positioning members 60.

Also in the third embodiment, by adjusting the length of latching portion 66b, coil 20 may be positioned and fixed even when protruding portion 64 and/or latching portions 66a and 66b are not elastically deformed. Therefore, it is not necessary to manufacture positioning member 60 from a flexible material, and the positioning member may be manufactured from a substantially rigid material. In addition, as shown in FIG. 6, by forming a flange portion 68 extending in the generally vertical direction from the outer circumferential edge of coupling member 62, the coil may be accurately positioned in the axial direction while the upper and lower positioning members may have the same shape. In detail, as shown in FIG. 5, by forming flange portion on positioning member 60, the upper positioning member may be accurately axially positioned by contacting coupling member 62 to the axial end of the stator core, and the lower positioning member may be accurately axially positioned by contacting an upper end of flange portion 68 to the axial end of the stator core. Therefore, in the third embodiment, the positional accuracy of the coil may be improved while obtaining the benefit by using the positioning members having the same shape (i.e., the manufacturing cost may be reduced and/or parts management may be improved).

Figure 7:
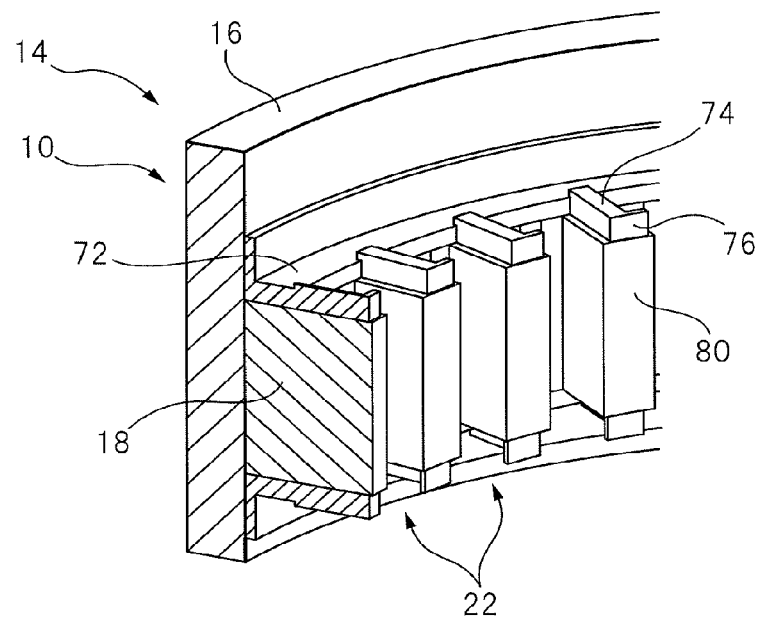
FIG. 7 is an enlarged view of a part of a stator where a coil fixing device according to a fourth embodiment of the present invention is arranged.
Figure 8:
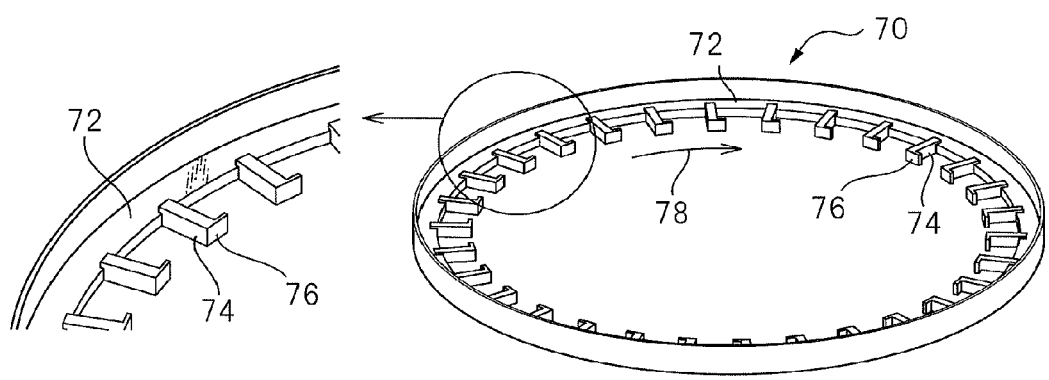
FIG. 8 is a view of a positioning member constituting the coil fixing device of FIG. 7, with a partial enlarged view thereof.

FIG. 7 is a view of an example where a coil fixing device according to a fourth embodiment of the present invention is applied to the electric motor. In the fourth embodiment, the extending direction of the latching portion arranged at the front end of the protruding portion is different from in the first, second and third embodiments. Concretely, as shown in FIG. 8, a positioning member 70, which constitutes the coil fixing device, has a coupling member 72 positioned on axial end 26 of stator core 18; a plurality of protruding portions 74 connected to coupling member 72 at the same angular intervals as the coils to be fixed to stator core 18, each protruding portion 74 radially inwardly extending from coupling member 72; a latching portion 76 connected to a front end of each protruding portion 74, latching portion 76 extending from the front end of each protruding portion 74 in a direction (in the illustrated embodiment, a circumferential direction of stator core 18) across an extending direction of protruding portion 74. In the illustrated embodiment, coupling member 72 is a generally annular member which couples protruding portions 74, and protruding portion 74 extends while being separated from axial end 26 of stator core 18. Protruding portion 74 and latching portion 76 are at right angles to each other, and each latching portion 76 extends in one circumferential direction of the stator core as indicated by an arrow 78.

Figure 9:
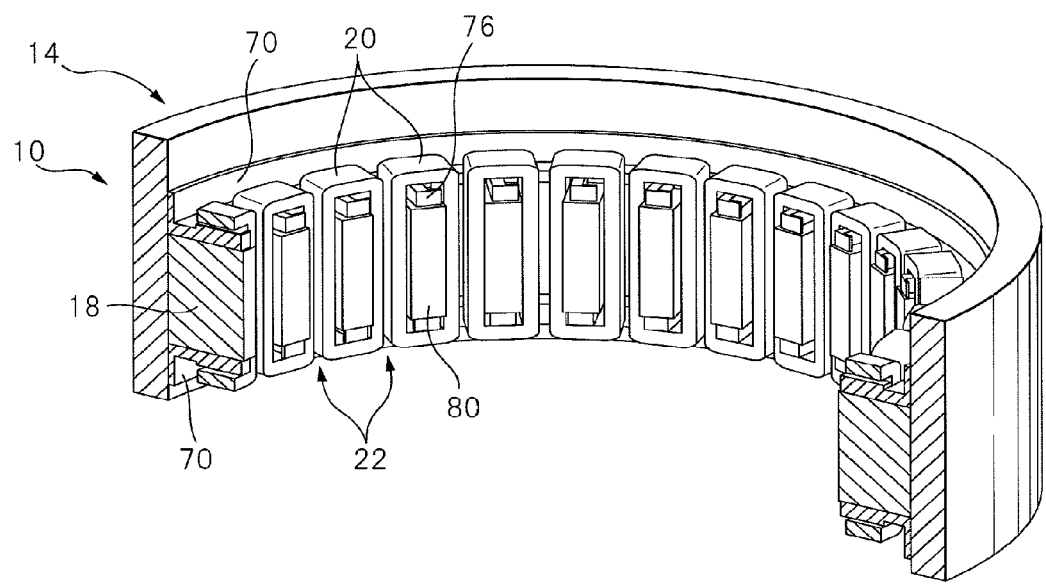
FIG. 9 is a view showing a state wherein a coil is positioned on the stator having the coil fixing device according to the fourth embodiment.
Figure 10:
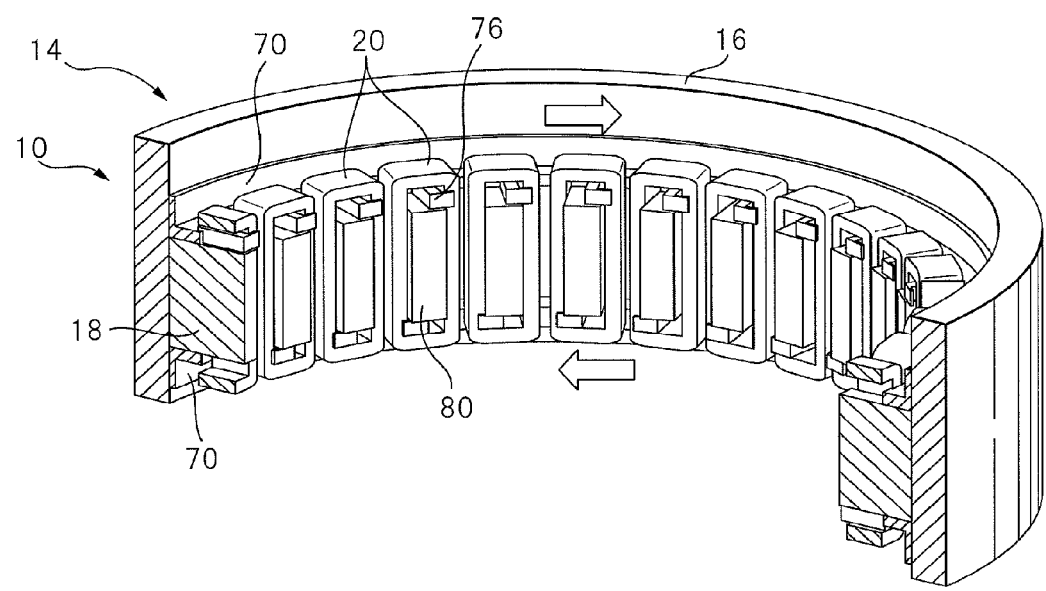
FIG. 10 is a view showing a state wherein the coil is fixed by rotationally moving the coil fixing device from the state of FIG. 9.
Figure 11:
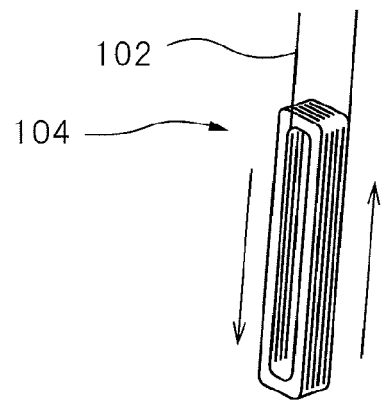
FIG. 11 is a view showing a coil to be attached to a stator core of an electric motor.
Figure 12:
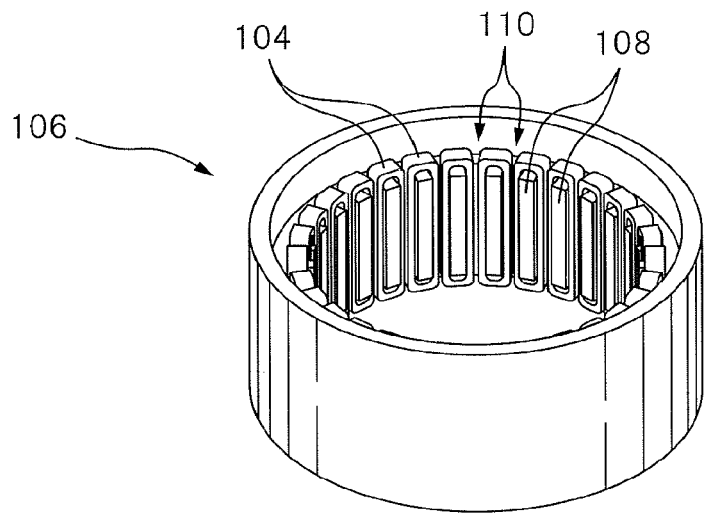
FIG. 12 is a view showing a state wherein the coil of FIG. 11 is inserted into a slot formed in a stator core a conventional electric motor.
Figure 13:
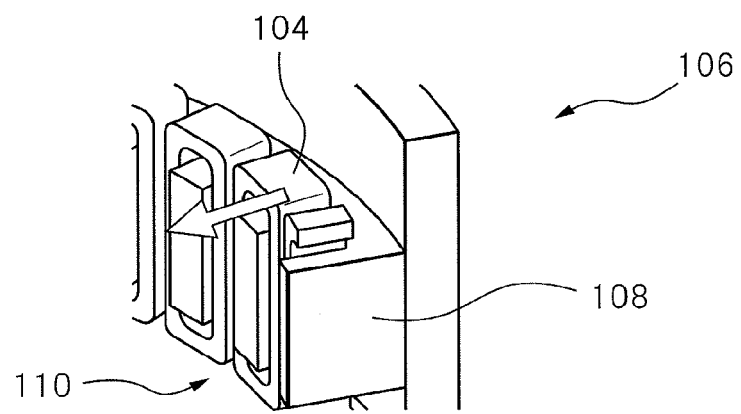
FIG. 13 is a partial enlarged view of FIG. 12, explaining that the coil inserted into the slot of the stator core may be detached from the slot.

Next, with reference to FIGS. 9 and 10, a process for fixing the coil using coil fixing device 70, is explained. First, as shown in FIG. 7 or 9, two coil fixing devices 70 having the same shape are attached to the both axial ends of stator core 18. In this regard, coil fixing device 70 is attached to stator core 18 so that coil 20 is not prevented from being inserted into slot 22. Concretely, the length of each latching portion 76 in the circumferential direction of the stator is equal to or shorter than the width (or the circumferential length) of a block portion 80 of stator core 18. As shown in FIG. 7, coil fixing device 70 is positioned so that each latching portion 76 does not project from block portion 80 in the circumferential direction.

From this state, as shown in FIG. 9, coil 20 is inserted into slot 22. Therefore, in the fourth embodiment, unlike the other embodiments, coil fixing device 70 does not interfere with coil 20 when inserting the coil, and it is not necessary to incline the coil for inserting the coil into the slot as shown in FIG. 3. In the state of FIG. 9, since coil 20 may be detached from stator core 18, it is preferable that the coil is pressed from the inner radius side (or held in the slot) by using a jig (not shown), etc.

Next, as shown in FIG. 10, two coil fixing devices 70 are rotated in the opposed circumferential directions so that latching portions 76 are engaged with the upper and lower portions at each coil 20, whereby each coil 20 is positioned and fixed to stator core 18. In this regard, the distance of rotational movement of each coil fixing device 70 may be determined so that each latching portion 76 can project from block portion 80 of stator core 18 in the circumferential direction thereof. From the state of FIG. 10, by removing the above jig (not shown), the fixing operation of the coil is completed. In the fourth embodiment, since the positioning members having the same shape are used, parts management may be improved. Further, since the coil fixing device does not interfere with the coil and it is not necessary to incline the coil when inserting the coil, the fourth embodiment is particularly suitable for automating a manufacturing or assembling process of the electric motor.

In any embodiment, it is preferable that the positioning member be engaged with the inner portion of stator 10 without forming a gap therebetween.

Concretely, it is preferable that the outer circumferential edge of the annular coupling portion of the positioning member be fixed to the inner surface of case 16 of stator 10 by fitting or interdigitation. In this regard, as shown in FIG. 10, coil fixing device 70 of the fourth embodiment can be rotated (or can slide on the inner surface of case 16) by a predetermined distance in the circumferential direction by being applied a predetermined force, whereas the fixing device may be fixed to the inner surface of case 16 by fitting. By virtue of this, the positioning member may be accurately positioned relative to the stator, whereby the coil, which is held and fixed by the positioning member, may be accurately positioned and fixed relative to the stator.

In any embodiment, the positioning member may be integrally formed by resin molding, etc. However, it is not necessary to form the generally annular positioning member as one piece, and the positioning member may be formed as a dividable component in view of manufacturing cost, etc.

According to the present invention, by using the fixing device having the positioning member, each coil can be accurately positioned and fixed to the stator without using adhesives, etc., which may negatively affect the characteristic of the electric motor.

When the lengths of the latching portions of the respective positioning members positioned at the both ends of the stator core are different from each other, each coil can be positioned and fixed without elastically deforming the positioning member.

When the two latching portions extending in the opposed directions are arranged at the front end of each protruding portion of the positioning member, only one kind of positioning member may be used, which is advantageous in terms of the manufacturing cost or parts management. When the latching portion extending in the circumferential direction of the stator core is arranged at the front end of each protruding portion of the positioning member, the coil can be positioned and fixed only by rotating the coil in the circumferential direction after attaching the coil.

When the coupling portion of the positioning member has the annular shape having the outer circumferential edge which fitted with the inner surface of the stator, the positioning member may be accurately positioned relative to the stator, whereby the positional accuracy of each coil may be improved.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A coil fixing device for an electric motor including a stator having a stator core with a plurality of slots, a rotor rotatable relative to the stator, and a plurality of coils respectively inserted into the plurality of slots, the coil fixing device being used to position and fix each, of the plurality of slots, the stator core, the coil fixing device having a coil positioning member comprising:
a coupling member positioned at an axial end of the stator core;
plurality protruding connected to the coupling member at the same angular intervals as the plurality of coils, each protruding portion radially inwardly extending from the coupling member; and
a latching portion connected a front end of each protruding portion, the latching portion extending from the front end of each protruding portion in a direction across an extending direction of the protruding portion,
wherein two latching portions are arranged at the front end of each protruding portion of the coil positioning member, the two latching portions extending in opposed directions in relation to an axial direction of the stator.

2. A coil fixing device for an electric motor including a stator having a stator core with a plurality of slots, a rotor rotatable relative to the stator, and a plurality of coils respectively inserted into the plurality of slots, the coil fixing device being used to position and fix each of the plurality of coils to the stator core, the coil fixing device having a coil positioning member comprising:
a coupling member positioned at an axial end of the stator core;
a plurality of protruding portions connected to the coupling member at the same angular intervals as the plurality of coils, each protruding portion radially inwardly extending from the coupling member; and
a latching portion connected to a front end of each protruding, portion, the latching portion extending from the front end of each protruding portion in a direction across an extending direction of the protruding portion,
wherein a latching portion is arranged at the front end of each protruding portion of the coil positioning member, the latching portion extending in a circumferential direction of the stator.

3. The coil fixing device as set forth in claim 2, wherein coil positioning members having the same shape are located at both axial ends of the stator core.

4. The coil fixing device as set forth in claim 1, wherein the coupling member has an annular shape with an outer circumferential edge which is fitted with inner surface of the stator.

5. An electric motor having the coil fixing device as set forth in claim 1.

* * * * *

UNITED STATES PATENT AND TRADEMARK OFFICE
CERTIFICATE OF CORRECTION

PATENT NO. : 8,853,912 B2  
APPLICATION NO. : 13/865246  
DATED : October 7, 2014  
INVENTOR(S) : Tatsuya Senoo Page 1 of 1

It is certified that error appears in the above-identified patent and that said Letters Patent is hereby corrected as shown below:

Title Page, below Item (65) should read:

--(30) Foreign Application Priority Data  
Jun. 1, 2012     (JP)...........................2012-126181  
Dec. 19, 2012        (JP).........................2012-276964--.

Signed and Sealed this  
Thirtieth Day of December, 2014

Michelle K. Lee  
*Deputy Director of the United States Patent and Trademark Office*